UNITED STATES PATENT OFFICE.

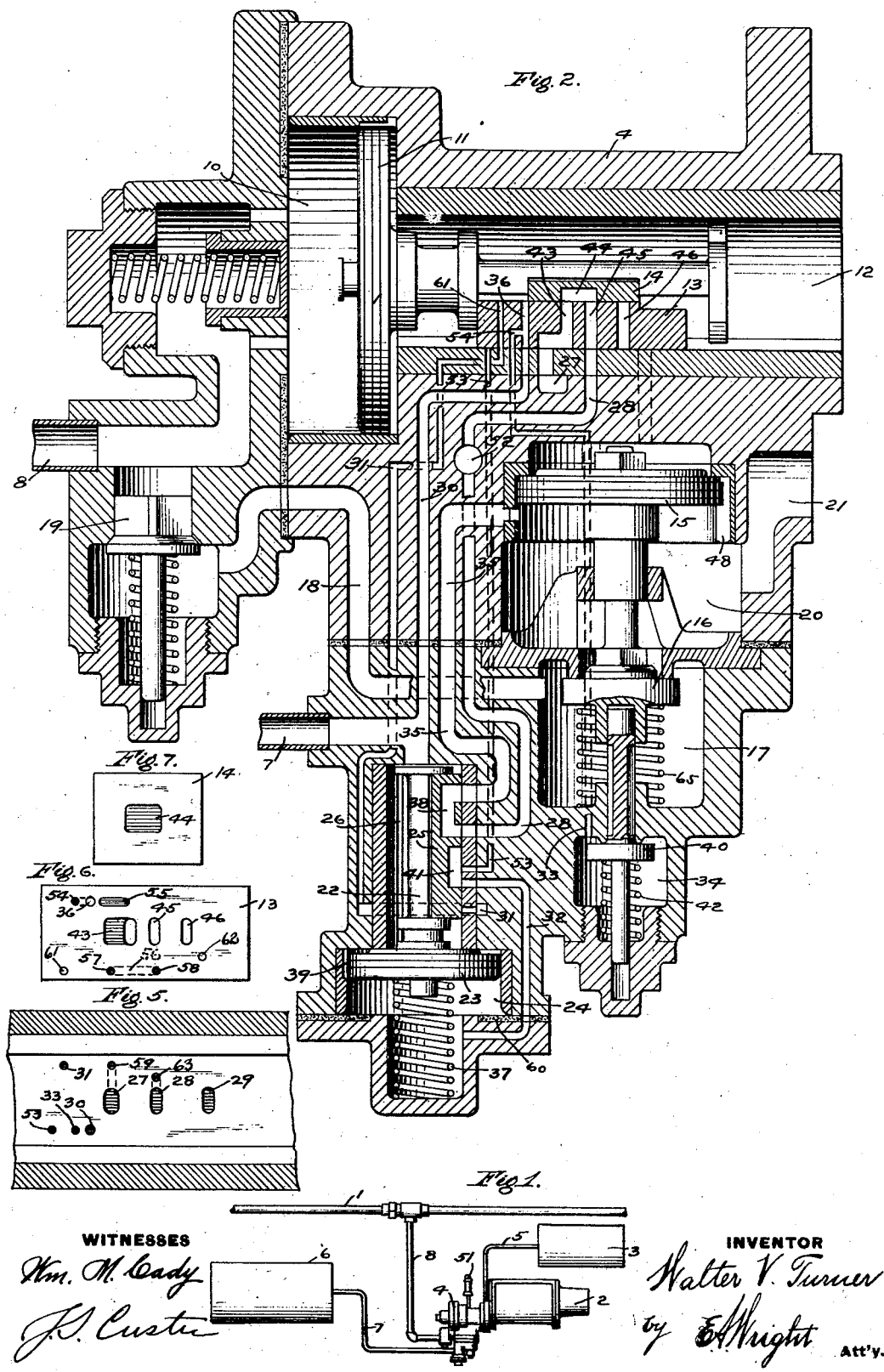

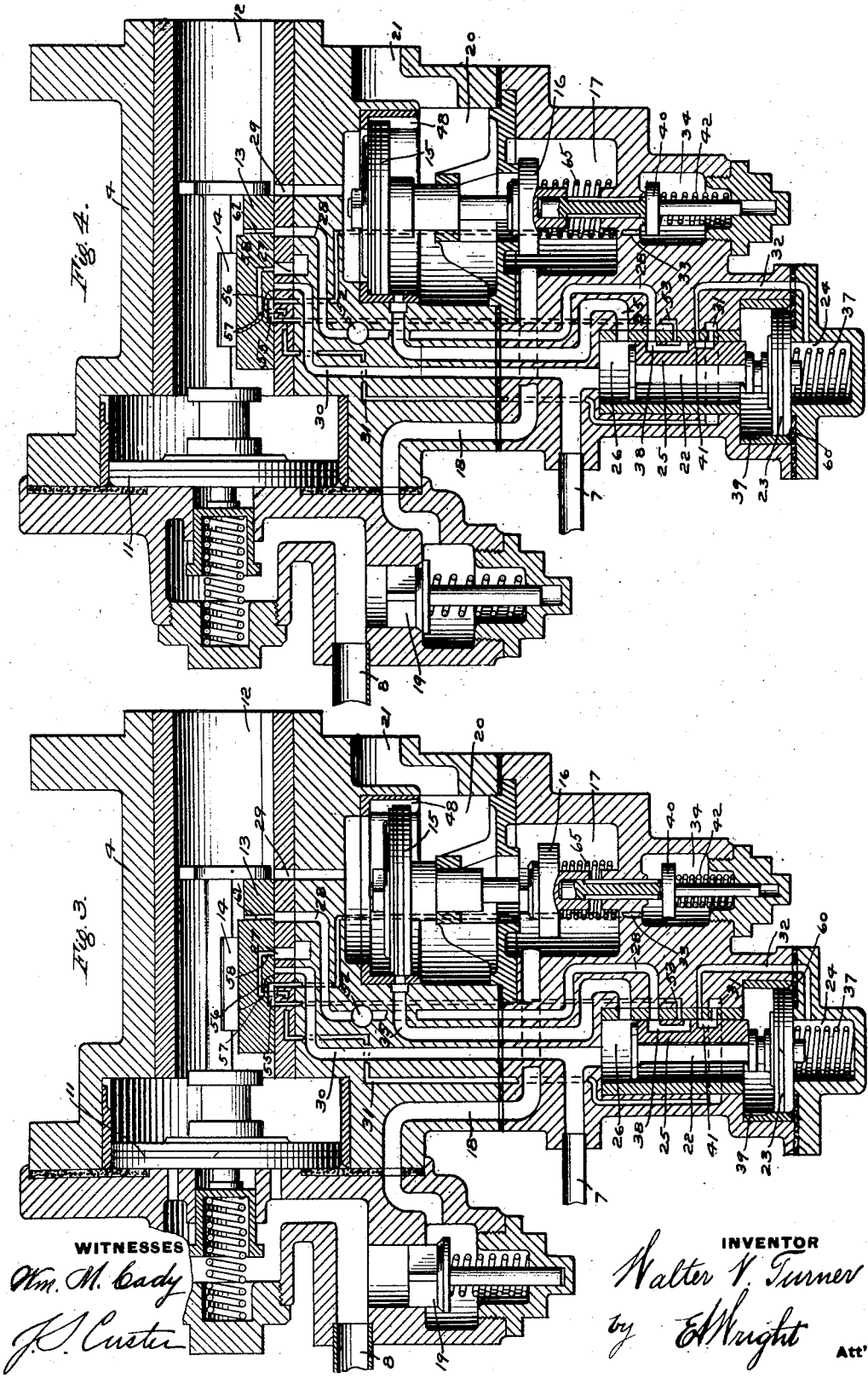

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

HIGH-PRESSURE EMERGENCY-BRAKE.

1,078,016.  Specification of Letters Patent.  Patented Nov. 11, 1913.

Application filed December 27, 1907. Serial No. 408,258.

*To all whom it may concern:*

Be it known that I, WALTER V. TURNER, a citizen of the United States, residing at Edgewood, in the county of Allegheny and State of Pennsylvania, have invented new and useful Improvements in High-Pressure Emergency-Brakes, of which the following is a specification.

My invention relates to automatic fluid pressure brakes, and has for its principal object to provide an improved triple valve mechanism having means for obtaining a high brake cylinder pressure in an emergency application of the brakes.

Another object of my invention is to facilitate the release of the brakes after an emergency application.

It has been heretofore proposed to provide a supplemental reservoir or other additional source of fluid pressure and a valve mechanism operating in an emergency application of the brakes for supplying air from the supplemental reservoir to the brake cylinder. With these prior devices, the supplemental reservoir pressure equalizes with the auxiliary reservoir as well as the brake cylinder, so that in an emergency application the final auxiliary reservoir pressure is somewhat higher than the degree of pressure at which the auxiliary reservoir and brake cylinder alone would equalize, thereby requiring a correspondingly higher train pipe pressure to release the brakes, while the brake cylinder pressure is much less than would be the case if the supplemental reservoir pressure were admitted to the brake cylinder only.

According to my improvements I provide means operating in an emergency application of the brakes for supplying air from the auxiliary reservoir to the brake cylinder while communication from the supplemental reservoir to the brake cylinder is closed, and adapted upon equalization of auxiliary reservoir and brake cylinder pressures to close the auxiliary reservoir communication and open the communication for supplying air from the supplemental reservoir to the brake cylinder.

Another feature of my invention contemplates providing means for opening communication from the auxiliary reservoir to a blow down or safety valve in an emergency application of the brakes, whereby the auxiliary reservoir pressure is reduced after communication from the auxiliary reservoir to the brake cylinder has been closed, and the release of the brakes thereby still further facilitated.

Another object of my invention is to provide an improved valve mechanism for governing the supply of air from an additional source of pressure to the brake cylinder, which is adapted to be actuated by the emergency piston but having means independent of said piston for maintaining the high pressure valve open throughout the emergency application.

In the accompanying drawings, Figure 1 is a diagrammatic illustration of a car air brake equipment, with one form of my invention applied thereto; Fig. 2 a vertical sectional view of a triple valve device embodying a preferred form of my invention, showing the parts in full release position, the location of some of the ports being slightly distorted in order to more clearly show the same; Fig. 3 a similar view, showing the parts in the emergency application position, with communication open from the auxiliary reservoir to the brake cylinder; Fig. 4 a similar view, with the parts in emergency position, but with the auxiliary reservoir cut off and communication open from the supplemental reservoir to the brake cylinder; Fig. 5 a plan view of the main slide valve seat for the above triple valve device, showing the arrangement of ports therein; Fig. 6 a face view of the main slide valve, showing the location of ports; and Fig. 7 a face view of the graduating slide valve, adapted to be mounted on and to move relatively to said main slide valve.

According to Fig. 1 of the drawings, the car air brake equipment may comprise a train pipe 1, connected by a branch pipe 8 to a triple valve device 4, a brake cylinder 2, auxiliary reservoir 3 and supplemental reservoir 6, connected respectively by pipes 5 and 7 to the triple valve device 4.

The triple valve device 4 comprises a casing having a piston chamber 10 containing the triple valve piston 11 and valve chamber 12, open to the auxiliary reservoir and containing the usual main slide valve 13 and auxiliary graduating valve 14. An emergency valve mechanism is also embodied in the triple valve casing, and may comprise an emergency piston 15, for actuating the usual quick action or train pipe vent valve 16, contained in the valve chamber 17, and controlling communication from the train pipe passage 18 to the chamber 20, below the emergency piston 15, which chamber is in open communication with the brake cylinder passage 21, the passage 18 being provided with a check valve 19, to prevent back flow of air from the brake cylinder to the train pipe.

According to a preferred construction of my invention, the high pressure emergency or supplemental valve mechanism is embodied in the triple valve casing and comprises a piston or movable abutment 23, operating in piston chamber 24, and a slide valve 25 actuated by said piston and contained in a valve chamber 26. The slide valve 25 controls communication from the supplemental reservoir 6, or other source of fluid pressure to the brake cylinder, the pipe 7, leading to said reservoir, being in open communication with the valve chamber 26. The valve seat for valve 25 is provided with a port 35, leading to the piston chamber of the piston 15 and adapted to be controlled by the movement of said piston. A port 28 from the main slide valve seat also leads to the seat of the valve 25. In the normal inner position of the valve 25, a cavity 38 connects the ports 28 and 35, thereby establishing communication from the main slide valve seat to the chamber 20 and the brake cylinder.

The supplemental reservoir 6 and valve chamber 26 may be charged from the train pipe through the main slide valve chamber by providing a port 30, in open communication with the supplemental reservoir and leading to the main slide valve seat, the main valve 13 being provided with a through port 36, adapted to register with the port 30 in the release position of the triple valve. A feed groove 39 is provided around the piston 23, so that the fluid pressures on opposite sides of the piston 23 are normally balanced, a spring 37 being provided for maintaining the piston 23 in its inner position when the pressures are thus balanced.

The operation of the high emergency pressure valve mechanism is preferably governed by movement of the emergency piston 15, and for this purpose, a valve 40 may be provided, which is adapted to be actuated by the piston 15 to open communication from the valve chamber 34 of said valve to chamber 17. The valve chamber 34 is connected by a passage 33 to the main slide valve seat, and a passage 53 leads from the main slide valve seat and opens to the valve seat of the slide valve 25. A cavity 41 in said valve 25 connects port 53 with port 32, leading to the piston chamber 24, in the normal position of the piston 23 and valve 25, and a cavity 55 in the main slide valve is adapted to connect passages 33 and 53 in the emergency position thereof, thus establishing communication from the piston chamber 24 to the valve chamber 34, when the triple piston assumes the emergency position.

The seat for the main slide valve is provided with the usual brake cylinder exhaust port 27, which is connected to the brake cylinder in release position through a port 43 in the main valve 13, cavity 44 in the graduating valve 14, port 45, port 28, cavity 38 in the high pressure emergency valve 25, port 35, and emergency piston chamber 20 to the brake cylinder passage 21 and the brake cylinder. The main slide valve is also provided with the usual service port 46, and the main valve seat with the emergency port 29, leading to the upper side of emergency piston 15. Fluid under pressure being admitted to the train pipe, flows through the usual feed groove around the triple valve piston to main slide valve chamber 12 and the auxiliary reservoir. From valve chamber 12 air flows through the port 36 in the main valve to port 30, and thence to the supplemental reservoir 6 and valve chamber 26, and from valve chamber 26 through the feed groove 39 to piston chamber 24. Thus the above parts may be charged to the standard train pipe pressure, and the fluid pressures being balanced on the opposite sides of the piston 23, the spring 37 maintains the high pressure valve mechanism at its inner position, in which the cavity 38 connects ports 28 and 35, so that the brake cylinder is open to the exhaust port 27, through the port 28, port 45, cavity 44 in the graduating valve, and port 43.

A gradual reduction in train pipe pressure causes the triple valve piston 11 to move out to service position, in which the service port 46 registers with port 28. Air is thus supplied from the auxiliary reservoir to the brake cylinder, as ports 28 and 35 are connected by the cavity 38 in the high pressure emergency valve 25. When the flow of air from the auxiliary reservoir to the brake cylinder has reduced the auxiliary reservoir pressure to substantially that in the train pipe, the triple piston shifts the graduating valve 14, closing the service port 46. The brake cylinder pressure may be increased as desired by further reductions in train pipe pressure, and the brakes may be released by increasing the train pipe pressure so that the triple valve piston is shifted to release position, connecting the brake cylinder to the atmosphere, as will be clearly understood.

An emergency application of the brakes is effected by causing a sudden reduction in train pipe pressure, whereupon the triple valve piston makes its full traverse and seats on the usual emergency gasket, and the main slide valve is shifted, uncovering the emergency port 29, as shown in Fig. 3. Fluid from the auxiliary reservoir then flows through the port 29 to the emergency piston 15, which is thereupon forced to its extreme outer position. In the present construction, a by pass 48 is provided around the emergency piston 15, so that air from the auxiliary reservoir flows to the chamber 20 and thence to brake cylinder passage 21 and the brake cylinder. The movement of the piston 15 also opens the train pipe vent valve 16, so that fluid from the train pipe flows past the check valve 19, through the passage 18 to chamber 17 and thence to chamber 20 and the brake cylinder, producing the local venting of the train pipe and quick action in the well understood manner. The valve 40 is also opened by the movement of the piston 15 thereby opening communication from the piston chamber 24 through port 32, cavity 41 in valve 25, port 53, cavity 55 in the main slide valve 13, port 33, and valve chamber 34 to chamber 17, and thence to chamber 20 and the brake cylinder. Fluid from the outer face of piston 23 is thus vented to the brake cylinder, so that the higher supplemental reservoir pressure on the inner side of the piston 23 shifts the piston and valve 25 outwardly.

In order to insure the full movement of and to maintain the piston 23 seated on the gasket 60, I preferably arrange the cavity 41 so as to cut off the port 53 during the outward movement of the valve 25 and connect the port 32 with the atmosphere; for this purpose I provide an additional port 31, which registers with cavity 41 during the final outward movement of the piston. The port 31 is connected by a cavity 56 in the emergency position of the main slide valve with an exhaust port 59, so that the outer face of the piston 23 is open to the exhaust and is consequently firmly maintained in its outer position. In this position the port 35 is open to the valve chamber 26 and the supplemental reservoir so that fluid therefrom flows into the port 35, but according to my present invention, I provide means for closing the supplemental reservoir outlet to the brake cylinder while the communication is open from the auxiliary reservoir to the brake cylinder, for this purpose I preferably locate the outlet of port 35 to the chamber 20 so as to be closed when the emergency piston 15 moves outwardly to open the auxiliary reservoir by-pass 48.

Upon substantial equalization of auxiliary reservoir pressure into the brake cylinder, the piston 15 is returned to its normal seat by the valve spring 65, as shown in Fig. 4, thereby closing communication to the auxiliary reservoir and uncovering the port 35, fluid thereupon flows from the supplemental reservoir through the port 35 to chamber 20 and the brake cylinder, thus augmenting the brake cylinder pressure.

It will now be apparent that by reason of my improvements, since the auxiliary reservoir is cut off upon equalization into the brake cylinder and the fluid in the supplemental reservoir then flows only to the brake cylinder a high brake cylinder pressure is obtained while the auxiliary reservoir pressure remains at the lower degree of pressure at which the same equalized into the brake cylinder, by reason of which the release of the brakes is facilitated.

In order to release the brakes after an emergency application, the train pipe pressure is increased as usual and the triple valve piston is thereby shifted to release position. In this position a through port 61 in the main slide valve registers with port 31, so that fluid from the auxiliary reservoir is admitted to the piston chamber 24 through port 31, cavity 41 in the valve 25 and port 32. Port 36 also registers with port 30, so that the higher pressure in the supplemental reservoir and the brake cylinder causes a return flow of fluid therefrom to the auxiliary reservoir. The opposing pressures on the piston 23 thus rapidly equalize and permit the spring 37 to return the piston 23 and valve 25 to the normal inner position, in which the cavity 38 connects the ports 28 and 35, and the fluid in the brake cylinder is released through port 35, cavity 38, port 28, port 45, cavity 44 in the graduating valve 14, and port 43 to exhaust port 27.

With the present construction, if it is desired to limit the brake cylinder pressure in service applications, a safety valve 51 is connected to port 52 leading to the passage 28, as this passage is open to the brake cylinder in service applications, and the full pressure is retained in emergency applications since passage 28 is then cut off from the brake cylinder. With this construction, when the parts are returned to release position, after an emergency application, the safety valve 51 being open to the port 28, an additional exhaust is provided, which assists in rapidly reducing the high pressure in the brake cylinder. The necessity for additional ports in the main valve for a safety valve is thus obviated.

Another feature of my invention consists in providing a through port 62 in the main slide valve, which is adapted to register with a port extension 63 of the port 28 in the emergency position, so that after the pressure has equalized from the auxiliary reservoir into the brake cylinder and the communication is closed, the auxiliary reservoir pressure is then reduced slowly through the restricted port 62, to the degree at which the safety valve 51 is adjusted, and the release of the brakes is thus still further facilitated, by reason of the low degree of auxiliary reservoir pressure remaining on the inner face of the triple valve piston. Further, by providing the above safety valve port 62, should the emergency piston 15 leak for any reason, so that the fluid from the brake cylinder at high pressure flows past the piston to the auxiliary reservoir, the pressure in the auxiliary reservoir will be prevented from exceeding the degree for which the safety valve is adjusted.

It has heretofore been proposed to provide means in addition to the usual feed groove around the triple valve piston, whereby the auxiliary reservoir is quickly recharged on releasing the brakes after an application thereof, as by providing a through port in the main slide valve, which is adapted to register in release position with a passage leading to the train pipe vent port 18. With my present invention I may utilize the port 33 for assisting in the quick recharge of the auxiliary reservoir and connected chambers, by providing a port 54 in the main slide valve which opens into the main slide valve chamber, as by connecting the same to the port 36, and which registers with port 33 in release position.

It will now be apparent that when the train pipe pressure is increased and the triple valve piston is shifted to release position, after an emergency application, fluid from the train pipe flows past the check valve 19 into passage 18 to chamber 17 and unseats the valve 40, so that air flows to the passage 33 and thence through the ports 54 and 36 to the main slide valve chamber, the auxiliary reservoir and the supplemental reservoir.

Having now described my invention, what I claim as new and desire to secure by Letters Patent is:—

1. In a fluid pressure brake, the combination with a train pipe, auxiliary reservoir, additional source of fluid pressure, brake cylinder, and a valve device operating upon a sudden reduction in train pipe pressure for supplying air from the auxiliary reservoir to the brake cylinder, of means operating upon equalization of auxiliary reservoir and brake cylinder pressures for opening communication from said additional source of fluid pressure to the brake cylinder.

2. In a fluid pressure brake, the combination with a train pipe, auxiliary reservoir, additional source of fluid pressure, brake cylinder, and a valve device for supplying air from the auxiliary reservoir to the brake cylinder in an emergency application of the brakes, of means operating upon equalization of auxiliary reservoir pressure into the brake cylinder for opening communication from said additional source of fluid pressure to the brake cylinder.

3. In a fluid pressure brake, the combination with a train pipe, brake cylinder, and supplemental reservoir, of means for controlling a supply port from the supplemental reservoir to the brake cylinder and an emergency piston for governing the outlet from said supplemental reservoir supply port to the brake cylinder.

4. In a fluid pressure brake, the combination with a train pipe, brake cylinder, and supplemental reservoir, of means for controlling the admission of air from the supplemental reservoir to a passage for supplying air to the brake cylinder and an emergency piston operating upon a sudden reduction in train pipe pressure for governing communication from said passage to the brake cylinder.

5. In a fluid pressure brake, the combination with a train pipe, auxiliary reservoir, brake cylinder, supplemental reservoir, and a valve device for governing the supply of air from the auxiliary reservoir to the brake cylinder, of means for controlling communication from the supplemental reservoir to a brake cylinder supply port and an emergency piston operating upon equalization of auxiliary reservoir and brake cylinder pressures for opening the outlet from said supply port to the brake cylinder.

6. In a fluid pressure brake, the combination with a train pipe, auxiliary reservoir, brake cylinder, supplemental reservoir, and a valve device for governing the supply of air from the auxiliary reservoir to the brake cylinder, of means for controlling communication from the supplemental reservoir to a brake cylinder supply port and an emergency piston operating upon equalization of auxiliary reservoir and brake cylinder pressures in an emergency application of the brakes for opening the outlet from said supply port to the brake cylinder.

7. In a fluid pressure brake, the combination with a train pipe, auxiliary reservoir, brake cylinder, supplemental reservoir, and triple valve, of an emergency valve mechanism operated by said triple valve upon a sudden reduction in train pipe pressure for supplying air from the auxiliary reservoir to the brake cylinder, and means governed by said emergency valve mechanism for opening communication from a supplemental reservoir supply port to the brake cylinder upon substantial equalization of the auxiliary reservoir pressure into the brake cylinder.

8. In a fluid pressure brake, the combination with a train pipe, auxiliary reservoir, brake cylinder, a triple valve device having a passage through which air is supplied from the auxiliary reservoir to the brake cylinder in service applications, and an additional source of fluid pressure, of means operated upon a sudden reduction in train pipe pressure for supplying air through said passage from the additional source of pressure to the brake cylinder, and a separate passage through which air is supplied to the brake cylinder from the auxiliary reservoir.

9. In a fluid pressure brake, the combination with a train pipe, auxiliary reservoir, brake cylinder, and an additional source of fluid pressure, of a piston operated in an emergency application of the brakes for controlling the supply of air first from the auxiliary reservoir and then from said additional source of fluid pressure to the brake cylinder.

10. In a fluid pressure brake, the combination with a train pipe, auxiliary reservoir, brake cylinder, and an additional source of fluid pressure, of a piston operated upon a sudden reduction in train pipe pressure for supplying air from the auxiliary reservoir to the brake cylinder, and adapted upon equalization of the auxiliary reservoir and brake cylinder pressures to open communication from the additional source of fluid pressure to the brake cylinder.

11. In a fluid pressure brake, the combination with a train pipe, auxiliary reservoir, brake cylinder, and an additional source of fluid pressure, of an emergency piston operated upon a sudden reduction in train pipe pressure for supplying air from the auxiliary reservoir to the brake cylinder and for closing a supply port from the additional source of pressure to the brake cylinder and adapted upon substantial equalization of the auxiliary reservoir pressure into the brake cylinder to open said supply port.

12. In a fluid pressure brake, the combination with a train pipe, auxiliary reservoir, brake cylinder, and an additional source of fluid pressure, of an emergency piston operated upon a sudden reduction in train pipe pressure for supplying air from the auxiliary reservoir to the brake cylinder and for closing a supply port from the additional source of pressure to the brake cylinder and adapted upon substantial equalization of the auxiliary reservoir pressure into the brake cylinder to close communication from the auxiliary reservoir to the brake cylinder and open said supply port to admit air from said additional source of fluid pressure to the brake cylinder.

13. In a fluid pressure brake, the combination with a train pipe, auxiliary reservoir, brake cylinder, and supplemental reservoir, of an emergency piston, a triple valve device operated upon a sudden reduction in train pipe pressure for supplying air from the auxiliary reservoir to and thereby operate said piston, and means governed by said piston for opening communication from the auxiliary reservoir to the brake cylinder and for closing a supply port from the supplemental reservoir, and adapted upon equalization of the auxiliary reservoir pressure into the brake cylinder to close the communication from the auxiliary reservoir to the brake cylinder and open said supply port to admit air from the supplemental reservoir to the brake cylinder.

14. In a fluid pressure brake, the combination with a train pipe, auxiliary reservoir, brake cylinder, supplemental reservoir and triple valve, of a valve device for controlling a supply port from the supplemental reservoir to the brake cylinder, subject on one side to supplemental reservoir pressure and having an equalizing port for normally balancing the fluid pressures on opposite sides of said valve device, and an emergency piston operating in an emergency application for releasing air from one side of said valve device to actuate the same.

15. In a fluid pressure brake, the combination with a train pipe, auxiliary reservoir, brake cylinder, supplemental reservoir and triple valve, of a piston and a valve actuated thereby for controlling a supply port from the supplemental reservoir to the brake cylinder, an emergency piston and a vent valve operated thereby for releasing fluid from one side of said supply piston through a port leading through the triple valve slide valve and said supply valve, and means operating during the movement of said supply valve for closing said vent port and opening a second port from said supply piston to the atmosphere.

16. In a fluid pressure brake, the combination with a train pipe, auxiliary reservoir, brake cylinder, supplemental reservoir and triple valve, of a piston subject on one side to supplemental reservoir pressure and having an equalizing port, a valve actuated thereby for controlling a supply port from the supplemental reservoir to the brake cylinder, an emergency piston operated by the triple valve upon a sudden reduction in train pipe pressure, a vent valve actuated thereby for releasing air from one side of said supply piston through a port leading through the triple valve slide valve and said supply valve, and means operating during the movement of the supply valve for closing said vent port, and opening a second vent port from said supply piston, leading through the triple valve slide valve to an exhaust port.

17. In a fluid pressure brake, the combination with a train pipe, auxiliary reservoir, brake cylinder and triple valve, of an emergency piston having means for closing communication between said auxiliary reservoir and brake cylinder upon equalization of pressures and a blow down valve for limiting the degree of pressure in the auxiliary reservoir in an emergency application.

18. In a fluid pressure brake, the combination with a train pipe, auxiliary reservoir, brake cylinder, and triple valve, of an emergency piston operated by said triple valve in emergency applications for supplying air from the auxiliary reservoir to the brake cylinder, and adapted upon equalization of auxiliary reservoir and brake cylinder pressures to close communication from auxiliary reservoir to brake cylinder, and a blown down valve communicating with the auxiliary reservoir in emergency position, for limiting the degree of pressure in the auxiliary reservoir.

19. In a fluid pressure brake, the combination with a train pipe and brake cylinder, of an emergency piston for controlling the local venting of air from the train pipe and a triple valve device having a brake cylinder port controlled by the movement of the emergency piston for supplying air to the brake cylinder in a service application of the brakes.

20. In a fluid pressure brake, the combination with a train pipe and a brake cylinder, of an emergency piston, a train pipe vent valve operated thereby, and a triple valve device for operating said piston in an emergency application of the brakes and a port for supplying fluid to the brake cylinder in service applications, said port being controlled by the emergency piston for also supplying fluid to the brake cylinder in emergency applications of the brakes.

21. In a fluid pressure brake, the combination with a train pipe, auxiliary reservoir, and supplemental reservoir, of a valve for controlling the supply of air from the supplemental reservoir to the brake cylinder, an emergency piston and a triple valve device for actuating said piston in an emergency application of the brakes, said triple valve device having its brake cylinder port governed by said supply valve and said emergency piston.

22. In a fluid pressure brake, the combination with a train pipe, auxiliary reservoir, brake cylinder, and supplemental reservoir, of a valve mechanism for controlling a supply port from the supplemental reservoir to the brake cylinder, an emergency piston for effecting the operation of said valve mechanism, and means independent of the emergency piston for maintaining said valve mechanism in open position.

23. In a fluid pressure brake, the combination with a train pipe, auxiliary reservoir, brake cylinder, supplemental reservoir, and triple valve, of a valve device for controlling the supply of air from said supplemental reservoir to the brake cylinder, an emergency piston and a valve operated thereby in an emergency application for actuating said valve device, said valve being adapted to control communication from the train pipe to a port open at the auxiliary reservoir in release position.

24. In a fluid pressure brake, the combination with a brake cylinder, a train pipe, and two sources of fluid under pressure, of a valve device for controlling communication from said sources to the brake cylinder and adapted to first supply fluid from one source and then from the other source of fluid pressure to the brake cylinder, and a piston and valve operated thereby upon a sudden reduction in train pipe pressure for controlling the operation of said valve device.

25. In a fluid pressure brake, the combination with a train pipe, a brake cylinder, and a plurality of receptacles for fluid under pressure, of a valve device for controlling communication from said receptacles to the brake cylinder and adapted to first supply fluid from one receptacle and then from another receptacle to the brake cylinder, and a piston and valve operated thereby upon a sudden reduction in train pipe pressure for controlling the operation of said valve device.

26. In a fluid pressure brake, the combination with a train pipe, a chamber the pressure in which operates to apply the brakes, and two receptacles adapted to contain a supply of fluid under pressure, of a valve device operated by the flow of air from one receptacle to said chamber for closing communication from the other receptacle and means adapted to shift said valve device to close communication from the first receptacle and to open communication from the second receptacle to said chamber.

27. In a fluid pressure brake, the combination with a train pipe, a chamber the pressure in which operates to apply the brakes, and two receptacles adapted to contain a supply of fluid under pressure, of a valve device operated by the flow of air from one receptacle for opening communication from said receptacle to said chamber and means for shifting said valve device to close comunication from said receptacle and open communication from the other receptacle upon equalization of the pressure in the chamber and the first mentioned receptacle.

28. In a fluid pressure brake, the combination with a train pipe and a chamber the pressure in which operates to effect an application of the brakes and a plurality of receptacles adapted to contain fluid under pressure, of a valve mechanism adapted upon a reduction in train pipe pressure to admit fluid under pressure from said receptacles to said chamber and operating first to open communication from one receptacle to said chamber and then close said communication from said receptacle and open communication from another receptacle, to said chamber.

29. In a fluid pressure brake, the combination with a brake cylinder and train pipe, of a triple valve device having a passage through which air is supplied from the auxiliary reservoir to the brake cylinder in service applications of the brakes, a safety valve in said passage for limiting the pressure of fluid supplied to the brake cylinder, and means operating upon a sudden reduction in train pipe pressure for cutting off said passage and supplying fluid from the auxiliary reservoir through another passage to the brake cylinder.

30. In a fluid pressure brake, the combination with a brake cylinder and train pipe, of a triple valve device provided with a passage through which air is supplied from the auxiliary reservoir to the brake cylinder in service applications, a safety valve in said passage for limiting the pressure in the brake cylinder, and means operating upon a sudden reduction in train pipe pressure for cutting off said passage from the brake cylinder.

In testimony whereof I have hereunto set my hand.

WALTER V. TURNER.

Witnesses:
R. F. EMERY,
WM. M. CADY.